United States Patent
Lee (10) Patent No.: US 7,369,518 B2
(45) Date of Patent: May 6, 2008

(54) APPARATUS AND METHOD FOR REDUCING POWER CONSUMPTION IN AD-HOC NETWORK

(75) Inventor: Seong-hee Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 716 days.

(21) Appl. No.: 10/720,539

(22) Filed: Nov. 25, 2003

(65) Prior Publication Data

US 2004/0105401 A1    Jun. 3, 2004

(30) Foreign Application Priority Data

Dec. 2, 2002  (KR) .............. 10-2002-0076039

(51) Int. Cl.
  G08C 17/00   (2006.01)
  H04B 1/16   (2006.01)
  H04M 1/00   (2006.01)
(52) U.S. Cl. .............. 370/311; 455/574; 455/343
(58) Field of Classification Search ........ 370/311; 455/574, 343; 375/134
See application file for complete search history.

(56) References Cited

U.S. PATENT DOCUMENTS 6,564,074 B2 *  5/2003  Romans ............... 455/574
2002/0132603 A1 *  9/2002  Lindskog et al. ......... 455/343

FOREIGN PATENT DOCUMENTS

| EP | 0 615 364 A1 | 9/1994 |
| EP | 0 907 262 A2 | 4/1999 |
| EP | 1 206 070 A2 | 5/2002 |
| EP | 1 206 070 A3 | 8/2002 |

OTHER PUBLICATIONS

IEE Std 802.11-1997 Information Technology-telecommunications and Information exchange Between Systems- Local and Metropolitan Area Networks-specific Requirements-part II: Wireless Lan Medium Access Control (MAC) and Physical Layer (PHY) Specifications, Jun. 26, 1997, p. 133-136.

(Continued)

*Primary Examiner*—Joseph Feild
*Assistant Examiner*—Kiet Doan
(74) *Attorney, Agent, or Firm*—Sughrue Mion, PLLC (57) ABSTRACT

A power consumption reducing apparatus and method are provided wherein the apparatus includes a periodic active state conversion unit which converts an inactive state into an active state; a beacon frame reception unit which, in an active state, receives a beacon frame; an awake window setting unit which sets the awake window; an awake window interval counting unit which counts the interval value in the awake window; and an inactive state conversion unit which converts the awake window into an inactive state. According to the apparatus, an active state needs to be maintained only during a window interval such that power consumption can be reduced during an inactive interval. In addition, an ATIM window is replaced by an awake window such that an ATIM message that has been regarded as a network overhead, and an acknowledgement response frame to the message are removed, that is, the network overheads are removed.

49 Claims, 9 Drawing Sheets

OTHER PUBLICATIONS

Jung, E., et al., "An Energy Efficient MAC Protocol for Wireless LANs", IEEE Infocom, Jun. 23, 2002. p. 1756-1764, vol. 1 or 3, New York, NY.

Tseng, Y., et al., "Power-Saving Protocols for IEEE 802.11-Based Multi-Hop Ad Hoc Networks", IEEE Infocom, Jun. 23, 2002, p. 200-209, vol. 1 of 3, New York, NY.

IEEE standard Part II: Wireless LAN Medium Access Control (MAC) and Physical Layer (PHY) specifications, ISO/IEC 8802-11, ANSI/IEEE Std. 802.11, Aug. 20, 1999, p. 123-137.

European Search Report for Application No. 03257537.5 -1249 dated Aug. 2, 2007.

* cited by examiner

FIG. 1

| ELEMENT ID | LENGTH | DTIM COUNT | DTIM PERIOD | BITMAP CONTROL | PARTIAL VIRTUAL BITMAP |
|---|---|---|---|---|---|

FIG. 2

| ELEMENT ID | LENGTH | ATIM WINDOW |
|---|---|---|

FIG. 3

| FRAME CONTROL | DURATION | DA | SA | BSSID | SEQUENCE CONTROL | FCS |
|---|---|---|---|---|---|---|

| MODE | MODULTION | CODE RATE | DATE RATE | BPS |
|---|---|---|---|---|
| 1 | BPSK | 1/2 | 6Mbps | 24 |
| 2 | BPSK | 3/4 | 9Mbps | 36 |
| 3 | BPSK | 1/2 | 12Mbps | 48 |
| 4 | BPSK | 3/4 | 18Mbps | 54 |
| 5 | 16-QAM | 1/2 | 24Mbps | 96 |
| 6 | 16-QAM | 3/4 | 36Mbps | 144 |
| 7 | 64-QAM | 2/3 | 48Mbps | 192 |
| 8 | 64-QAM | 3/4 | 54Mbps | 216 |

APPARATUS AND METHOD FOR REDUCING POWER CONSUMPTION IN AD-HOC NETWORK

This application claims priority from Korean Patent Application No. 2002-76039, filed Dec. 2, 2002, the contents of which are incorporated herein by reference in their entirety.

BACKGROUND OF THE INVENTION

1. Field of the Invention

The present invention relates to a power consumption reducing apparatus and method.

2. Description of the Related Art

Power management is one of the most important issues in all types of wireless network environments. This is because devices forming a network are battery-powered mobile terminals. In the prior art, in order to maximize the throughput of a network, power consumption has been ignored to some extent and only those products that work in a full-powered state have been developed. However, transmission of multimedia data is expected to grow exponentially in the near future, the transmission of this huge volume of multimedia data demands much faster transmission speed, and in line with the higher transmission speed, power consumption also increases in proportion to the speed. Accordingly, development of a low power protocol is more important than ever.

Figure 1:
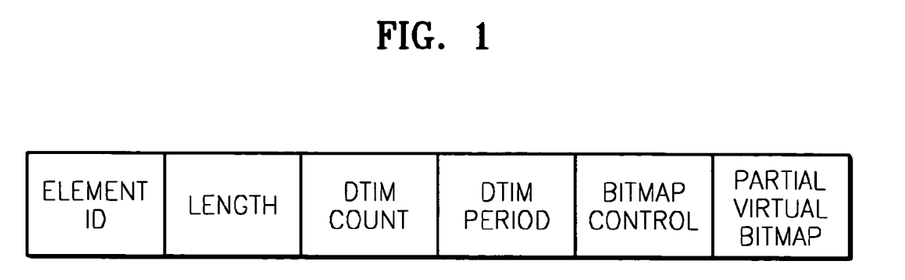
FIG. 1 is a format of an element TIM of a beacon frame.

FIG. 1 is a format of an element traffic indication message (TIM) of a beacon frame.

A wireless network is broken down to an infrastructure network and an ad-hoc network. The infrastructure network, or the infra network, is constructed by expanding from an existing wire LAN to a wireless LAN after building access points (AP). The ad-hoc network refers to a LAN constructed only by wireless terminals. In the infra network, all stations in an inactive state moves into an active state temporarily in order to receive a beacon frame. Though the information in 'partial virtual bitmap' field of the TIM shown in FIG. 1, a station which receives a beacon frame checks whether or not an AP has data to be transmitted to the station. For example, if this field is set to 1, it means that the AP has buffered data. If through the field it is confirmed that the AP has buffered data, the station maintains the active state in order to receive the data. If it is confirmed that the AP does not have buffered data, the station sets network information and then returns to the inactive state such that power consumption is reduced. Meanwhile, since there is no AP in the ad-hoc network, power consumption is reduced by using an ATIM window and a management frame referred to as an ad-hoc traffic indication message (ATIM).

Figure 2:
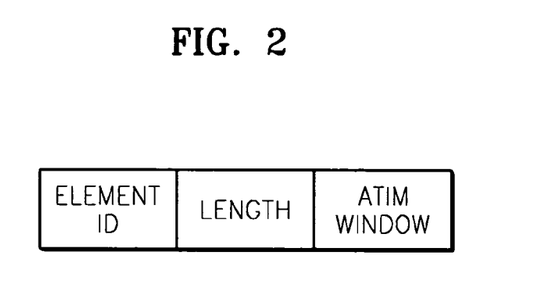
FIG. 2 is a format of an element IBSS of a beacon frame.

FIG. 2 is a format of an element independent basic service set (IBSS) of a beacon frame.

An ATIM window is an interval through which an active state of all stations is maintained and the interval is defined in the ATIM window field of the IBSS element included in a beacon frame.

Figure 3:
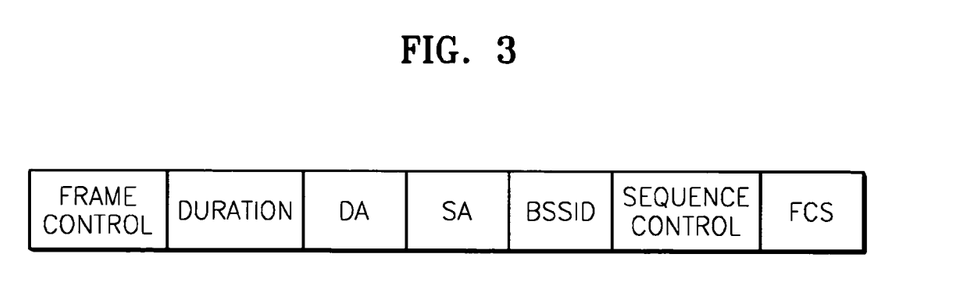
FIG. 3 is a format of an ATIM message.

FIG. 3 is a format of an ATIM message.

During an ATIM window interval, the management frame called an ATIM message is exchanged and the message is to indicate to a station in an inactive state that there is data to be transmitted by a source station. As shown in the ATIM message format of FIG. 3 (the ATIM message is a message in which the frame body part of an ordinary management frame is null), the frame has no special meaning and is only to indicate to a destination station that there is buffered data such that even after the ATIM window closes the active state of the station is maintained.

Figure 4:
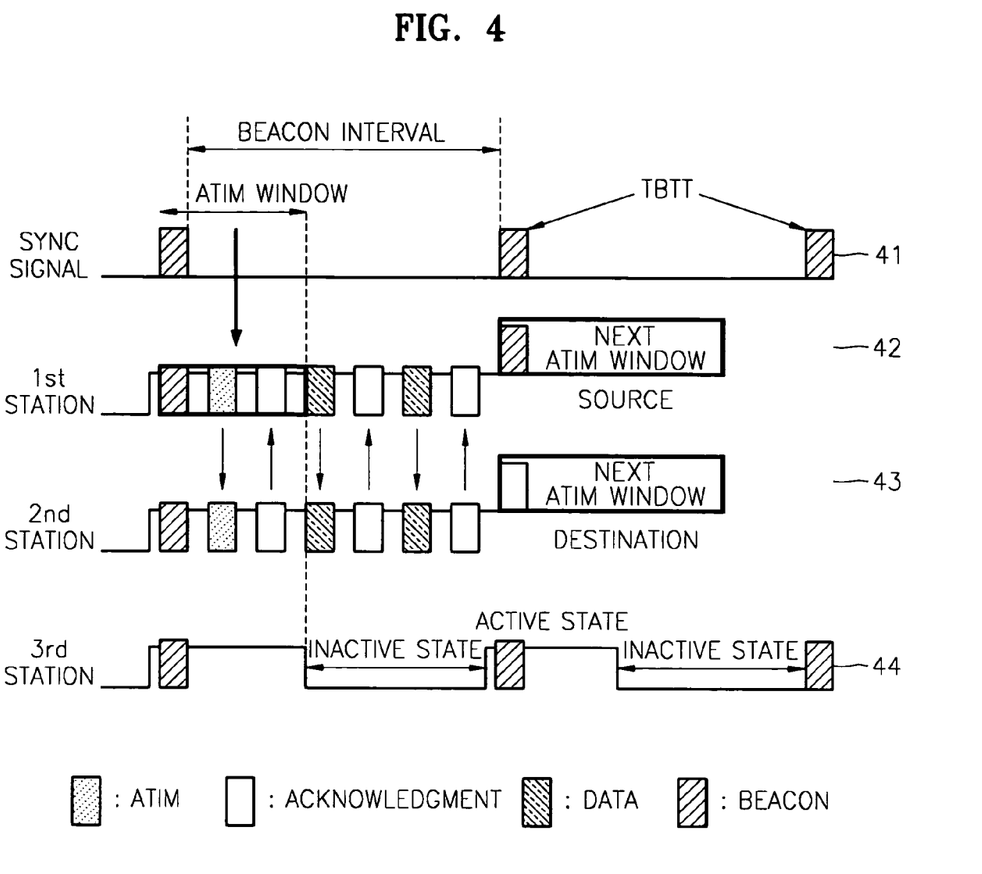
FIG. 4 is a waveform diagram of signals used in a power consumption reducing apparatus using the prior art ATM window.

FIG. 4 is a waveform diagram of signals used in a power consumption reducing apparatus using the prior art ATM window.

With a beacon frame transmitted in each target beacon transmission time (TBTT), that is, a beacon frame transmission period, as a starting point, all stations receive network information and enter into an active state for a new setting, and at the same time an ATIM window begins in step 41.

A first station transmits an ATIM message to a second station during an ATIM window interval so as to inform the second station that there is buffered data in step 42. The second station informed of the buffered data remains in an active state until the next ATIM window closes in step 43. Accordingly, the first station can transmit data to the second station. A third station which does not receive an ATIM message returns to an inactive state if the ATIM window closes such that power consumption is reduced in step 44.

In transmission of an ATIM message, successful transmission is confirmed by whether or not an acknowledgment frame (ACK frame in IEEE 802.11a standard) is received. If an acknowledgment frame is not received, the transmission is regarded as a failure and after a time period allocated by a back-off timer by a back-off algorithm, retransmission is tried. If an ATIM message cannot be transmitted in a given ATIM window, it will be tried in the next ATIM window. ACK frame is not needed for an ATIM message that is multicasted. Since a medium is accessed through a distributed coordination function (DCF) method that is an IEEE 802.11 method, transmission of an ATIM message is based on channel contention. Accordingly, stations are using channels through contention and stations that fail in the contention have to wait for a time period allocated by a back-off timer and then contend again. If a given window closes, basically, stations return to an inactive state to reduce power consumption and only those stations which receive an ATIM message remain in an active state even when the ATIM window closes and receive transmitted data. If an ATIM window closes, a period for actual transmission of data remains as shown in steps 42 and 43. A station that receives an ATIM message can exchange data only in the transmission period for actual data transmission and remain in an active state until the next ATIM window closes. Generally, the ratio of an ATIM window and the actual data transmission period is about 1:4. Even in the actual data exchange period, the DCF method that is an IEEE 802.11 standard, is used and stations are contending for a channel. Accordingly, only those stations which win in the contention can transmit data through a selected channel and the loser stations have to wait for a predetermined time period by the back-off algorithm and again contend for a channel. If a station cannot transmit data in a given period due to continuous failure in the channel contention, the station can transmit data in a data transmission period of a next ATIM window.

Accordingly, in the power consumption reducing method using the prior art ATIM window, the frame payload of an ATIM message frame which is transmitted during an ATIM window interval has a null value and no data information. It is only to maintain the active state of a station that received an ATIM message and therefore is a clear network overhead.

Figure 5:
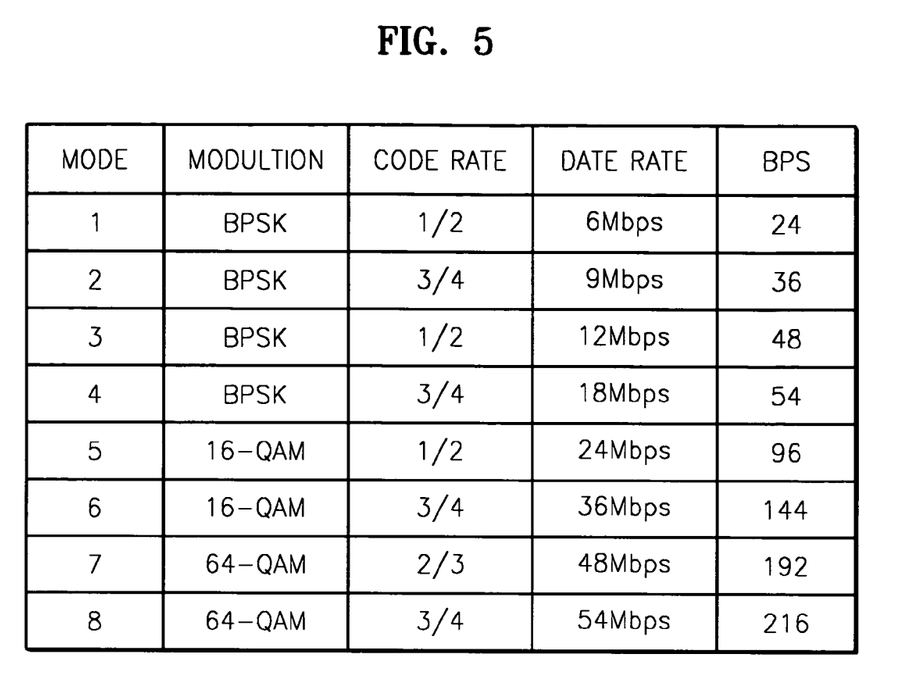
FIG. 5 is a table showing a variety of modes of IEEE 802.11a physical layer.

FIG. 5 is a table showing a variety of modes of IEEE 802.11a physical layer.

Generally, in order to analyze the performance of a network, a network throughput is calculated. When calculating the throughput, management and control frames are not considered and only data frames corresponding to actual data are used for calculation.

$$\text{Throughput} = \text{MPDU payload length/periods used for successful data transmission} \quad (1)$$

Here, MPDU stands for a Mac protocol data unit and indicates an actual data frame. When IEEE 802.11a is used, in order to identify the duration for data transmission, the number of data symbols should be identified. If an obtained number of symbols is multiplied by 4 μs that is an interval between symbols used in WEEE 802.11a, the length can be identified.

$$\text{Number of symbols} = \text{Ceiling}((16+8*\text{MPDU length}+6)/\text{BPS}) \quad (2)$$

BPS, or bits per second, of Equation 2 can be obtained using the table of FIG. 5. Assuming the data rate is 54 Mbps and all conditions are idealistic, if the network throughput is obtained using the Equation 1, the maximum throughput can be obtained as up to 30.8087 Mbps.

$$\begin{aligned}\text{Average back-off interval}(I) &= (2^{\wedge}I*(CW\min+1)-1)/2*SlotTime, \\ & \quad 0 <= I <= 6 \\ &= (CW\max)/2*SlotTime,\ I >= 6\end{aligned} \quad (3)$$

Here, I denotes the number of continuous retransmission due to the failure in channel contention.

One of the most ordinary factors affecting the throughput of a network is transmission delay due to an occurrence of an error. A representative case can be a back-off timer and retransmission. First, as for a back-off timer, whenever there is a failure in a contention, a back-off interval is newly given. Using the Equation 3, the back-off interval due to each failure is calculated. When the maximum throughput is 30.8087 Mbps that is idealistic, network contentions should not be considered and calculation is performed using the average back-off interval value that corresponds to a time when a back-off interval is not given. That is, in the Equation 3, value I is set to 0 and then calculation is performed. When there is one contention, that is, when value I is set to 1, the throughput obtained by the calculation decreases by 4.8065 Mbps, a 15.60% decrease from the maximum throughput. As for retransmission, when 10 frames are desired to be transmitted, and if an error occurs in one frame among the frames and 10% of the entire amount is retransmitted, the throughput decreases by 2.5035 Mbps, an 8.13% decrease from the maximum throughput. Accordingly, it can be shown that one of the most important factors affecting the network throughput is the back-off interval.

Therefore, in the power consumption reducing method using the prior art ATIM window, since this back-off interval is used in two places, including an ATIM window and a data transmission period, the network throughput is affected as much.

SUMMARY OF THE INVENTION

The present invention provides a power consumption reducing apparatus and method more effective than the prior art ATIM window method under an ad-hoc network environment complying with IEEE 802.11a.

According to an aspect of the present invention, there is provided a power consumption reducing apparatus comprising a periodic active state conversion unit which in each awake period converts an inactive state into an active state where power consumption is greater than in the inactive state; a beacon frame reception unit which in an active state converted by the period active state conversion unit, receives a beacon frame; an awake window setting unit which when the beacon frame reception receives the beacon frame, and if the interval value of an awake window, in which the active state is maintained for a predetermined time, among field values of the received beacon frame is valid, sets the awake window; an awake window interval counting unit which counts the interval value in the awake window set by the awake window setting unit; and an inactive state conversion unit which if the awake window counting unit finishes the counting, converts the awake window into an inactive state.

According to another aspect of the present invention, there is provided a power consumption reducing method comprising (a) in each awake period converting an inactive state into an active state where power consumption is greater than in the inactive state; (b) in the converted active state, receiving a beacon frame; (c) when the beacon frame is received in the step (b), and if the interval value of an awake window, in which the active state is maintained for a predetermined time, among field values of the received beacon frame is valid, setting the awake window; (d1) counting the interval value in the set awake window; and (e) if the counting is finished in the step (d1), converting the awake window into an inactive state.

BRIEF DESCRIPTION OF THE DRAWINGS

The above objects and advantages of the present invention will become more apparent by describing in detail exemplary embodiments thereof with reference to the attached drawings in which.

DESCRIPTION OF THE EXEMPLARY EMBODIMENTS

Figure 6:
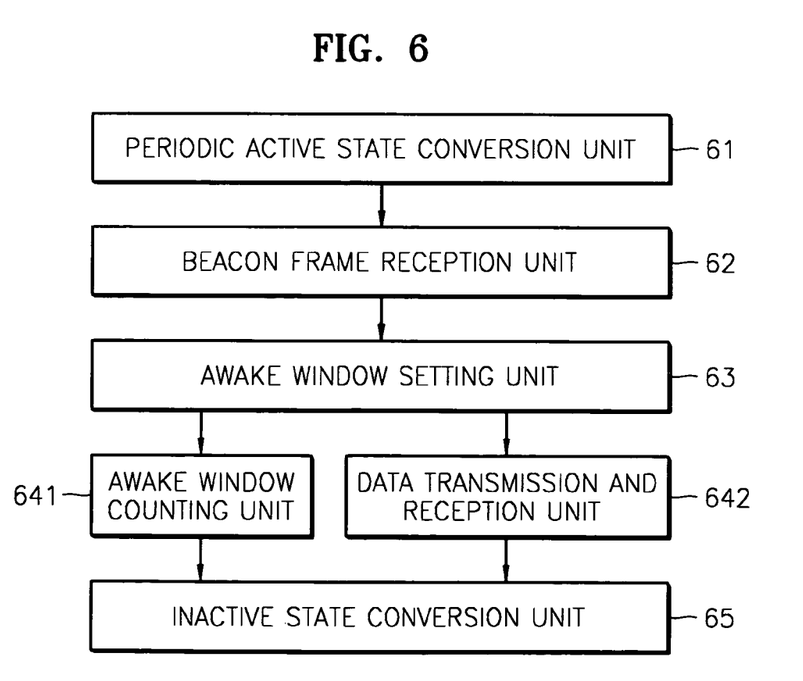
FIG. 6 is a diagram of the structure of a power consumption reducing apparatus according to the present invention.

FIG. 6 is a diagram of the structure of a power consumption reducing apparatus according to the present invention. The power consumption reducing apparatus comprises a periodic active state conversion unit 61, a beacon frame reception unit 62, an awake window setting unit 63, an awake window interval counting unit 64, a data frame transmission and reception unit 65, and an inactive state conversion unit 66.

The period active state conversion unit 61 in each awake period converts the state from an inactive state into an active state that has power consumption greater than that of the inactive state. Here, the active state is a state where full power is provided and the inactive state is a state where minimum power for conversion into an active state is provided. The inactive state corresponds to a variety of states including a doze state and a sleep state. In the IEEE 802.11a specification (the physical layer standard for a wireless LAN at a 5 GHz wireless band) to which the present invention is mainly applied, an inactive state is determined as a doze state.

The beacon frame reception unit 62 in the active state converted by the periodic active conversion unit 61 receives a beacon frame. Generally in a wireless network, since stations are separate and dispersed, it is necessary to share network information. For this, in an infrastructure network, an access point (AP) transmits its information to all surrounding stations and in an ad-hoc network, one station among many stations becomes a master and transmits network information it holds to all the surrounding stations. Among network information, synchronization information is representative and a beacon frame containing synchronization information is transmitted to all the surrounding stations so that all the stations on the wireless network are synchronized. The stations on a wireless network are usually mobile terminals and in order to minimize power consumption the terminals are in an inactive state that needs low power consumption. In order to receive a beacon frame, in every period when a beacon frame is transmitted, all stations on the wireless network should be awake and this period is an awake period, which is defined as a target beacon transmission time (TBIT) in IEEE 802.11a. That is, at a TBIT time, a master station transmits a beacon frame periodically. At this time, the stations that receive a beacon frame are in an active state at the TBIT time by the operation of a local timer inside each station, and again by the beacon frame, the local timer is synchronized. Therefore, always at a predetermined time, that is, at the TBIT time, all stations on the wireless network are all in an active state at the same time.

When the beacon frame reception unit 62 receives a beacon frame, if the interval value of an awake window, in which an active state is maintained for a predetermined period, among the field values in the received beacon frame, is valid, the awake window setting unit 63 sets an awake window.

It can be said that the awake window is a window newly defined in the place of an ad-hoc traffic indication message (ATIM) in the IEEE 802.11a specifications. During an awake window interval, all stations are awake (that is, in an active state) as in the prior art ATIM window interval and the awake window also begins with a beacon frame as the ATIM window. At this time, the interval value of the awake window should be the same as the existing ATIM window interval value. Since in each window interval, all stations are in an active state when the stations are operating in full power mode, only when the interval values are the same, power consumption reduction compared to the prior art ATIM window can be expected. If the awake window begins, all stations are in a state where a data frame can be exchanged at any time and therefore under this environment actual data can be transmitted and received. Accordingly, in the present invention a management frame such as the prior art ATIM message is not transmitted and a method by which actual data can be directly transmitted in the awake window is considered. In other words, since the prior art ATIM message has only one role to maintain the active state of a station even after a window interval finishes so that data can be exchanged, and has no other roles, the network overhead like the ATIM message can be removed by directly transmitting data in an awake window when all stations are actually in an active state. Thus not transmitting the management frame like the ATIM message but transmitting actual data directly to a destination is possible because all stations are awake during an awake window interval.

Also, in order to minimize power consumption, if the beacon frame reception unit 62 does not receive a beacon frame within a predetermined time, or if the beacon frame is received within a predetermined time and the interval value of an awake window included in the received beacon frame is not valid (for example, the awake window interval value=0), the awake window setting unit 63 immediately converts the state from an active state into an inactive state. Maintaining the full power state of a station system in order to receive a beacon frame that is just a synchronization frame, or maintaining the full power state even when an awake window is not needed because of an invalid interval value of the awake window included in the received beacon frame is waste of power.

The awake window interval counting unit 64 counts the interval value in an awake window set by the awake window setting unit 63. As described above, a new awake window is defined in the place of the prior art ATIM window and during this interval, actual data is transmitted. Then, if this interval finishes, all stations return again to an inactive state. Thus, power management is carried out. A time when an awake window interval finishes is implemented by a beacon frame that is received by all stations and as described above, information indicating the interval of an awake window is contained in a beacon frame.

Generally, counting is performed by repeatedly subtracting a predetermined unit value (usually one second) from the interval value of an awake window at each counting period. That is, since all stations have respective unique local timers, the interval value of an awake window is counted by using the local timer. A time when an awake window finishes is a time when the interval value of the awake window becomes 0.

The data frame transmission and reception unit 65 transmits and receives a predetermined data frame during the awake window set by the awake window setting unit 63. The inactive state conversion unit 66 converts the state from the awake window into an inactive state if the awake window counting unit 64 finishes counting.

If a power consumption reducing apparatus is an apparatus of any station on a wireless ad-hoc network having the IEEE 802.11a specifications, in every awake period, a station which is a master transmits a beacon frame to all stations on the wireless ad-hoc network through a channel (5 GHz, according to the IEEE 802.11a specifications).

Figure 7:
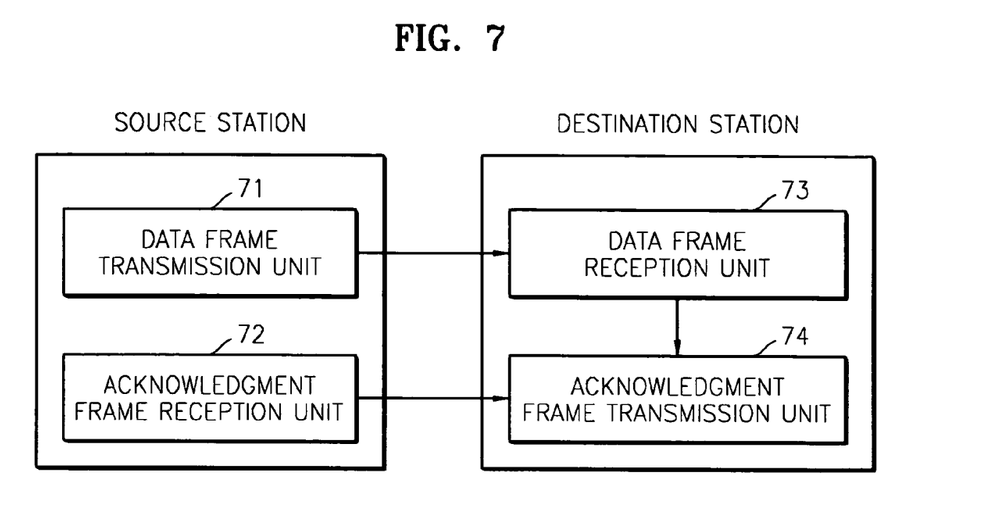
FIG. 7 is a detailed diagram of the structure of a data transmission and reception unit of FIG. 6.

FIG. 7 is a detailed diagram of the structure of a data transmission and reception unit of FIG. 6.

A data frame transmission and reception unit 65 of a power consumption reducing apparatus of a party that transmits a data frame (a source station) comprises a data frame transmission unit 71, and an acknowledgment frame reception unit 72.

The data frame transmission unit 71, if it obtains the right to exclusively use a channel through a contention for the channel, transmits a first data frame (a data frame which the first station desires to transmit to the second station) among data frames, to all stations on the wireless ad-hoc network except the first station, through the channel. Here, a case where it obtains the right to exclusively use the channel through a contention for the channel means that whether the channel is used by another station is checked first and if the channel is not used, the channel is used by the station preferentially. In a sense that a station which first accesses a channel not in use, uses the channel, the term "contention" is used and is a standard terminology of the IEEE 802.11.

At this time, the data frame transmission unit 71 transmits the first data frame in a broadcasting method. This means that the first data frame is transmitted at the same time to all the stations surrounding the first station. Among the stations surrounding the first station that receive the first data frame, only a station which has an address indicated by the destination field of the first data frame receives and processes the first data frame and the remaining stations discard the first data frame.

If the second station, which is in an awake window because it received a beacon frame, receives the first data frame through the channel, the acknowledgment frame reception unit 72 receives an acknowledgment frame from the second station of the first data frame transmitted by the data frame transmission unit 71 through the channel.

If the data frame transmission unit 71 does not obtain the right to exclusively use the channel, or if the acknowledgment frame reception unit 72 does not receive an acknowledgment frame, the data frame transmission unit 71 obtains the right to exclusively use the channel through a contention for the channel in the next awake window set after the awake window, and if the right is obtained, transmits again the first data frame among the data frames, to all the stations on the wireless ad-hoc network except for the first station.

Here, a case where it does not obtain the right to exclusively use the channel means that another station preoccupies the right to use, or that because of the right to use being obtained together with another station, a transmission collision occurs and either station cannot use the channel. In this case, in the next awake window, an attempt to obtain the right is retried. When a collision occurs, by using a back-off algorithm, an attempt to obtain the right is retried. That is, if a collision occurs, the order is determined by generating a random number and after waiting for a predetermined delay time, transmission is retried. The possibility of re-collision is much reduced because the time is adjusted by generating a random number.

During an awake window interval, successful transmission of actual data is determined by whether or not an acknowledgment frame (generally referred to as an ACK frame) is received. Accordingly, if the acknowledgment frame reception unit 72 does not receive an acknowledgment frame within the awake window interval, the inactive state conversion unit 66 converts the state from the awake window into an inactive state at a time when the awake window counting unit 64 finishes counting, and transmission is retried in the next awake window.

When the awake window counting unit 64 does not finish counting, and if the data frame transmission unit 71 does not obtain the right to exclusively use the channel, or if the acknowledgment frame reception unit 72 receives an acknowledgment frame, the inactive state conversion unit 66 converts the state from the awake window into an inactive state. Even though the counting is not finished, in these cases, maintaining the active state is not needed any more and in order to reduce power consumption, the state is converted from the awake window into an inactive state. In addition, if the data frame transmission unit 65 does not finish transmission of the first data frame immediately before the awake window counting unit 64 finishes counting, the inactive state conversion unit 66 increases the interval value by a predetermined value. That is, if data is all transmitted during an awake window interval, the state returns to an inactive state at a time when data transmission is finished, that is, when an acknowledgment frame is received. However, if there is remaining data to be transmitted when the awake window closes, the station calculates the transmission time for data which the station is to transmit and extends the awake window interval.

The data frame transmission and reception unit of the power consumption reducing apparatus of a party (a destination station) receiving a data frame comprises a data frame reception unit 73 and an acknowledgment frame transmission unit 74.

The data frame reception unit 73 receives a second data frame (a data frame which a third station transmits to the first station) among data frame from the third station, which received a beacon frame and therefore is in an awake window and has obtained the right to use the channel, through the channel.

When the acknowledgment frame transmission and reception unit 74 receives the second data frame and the destination field of the second data frame indicates the first station, and if through the contention for the channel use, the right to exclusively use the channel is obtained, an acknowledgment frame of the second data frame transmitted from the third station is transmitted through the channel. At this time, if the acknowledgment frame transmission unit 74 does not obtain the right to exclusively use the channel, in the next awake window set after the awake window, the acknowledgement frame transmission unit 74 obtains the right to exclusively use the channel through the contention for the channel use, and again transmits the acknowledgment frame to the third station through the channel.

At this time, even when the awake window counting unit 64 does not finish the counting, if the data frame reception unit 73 does not receive the second data frame, or the second data frame is received but the destination field of the second frame does not indicate the first station, or if the acknowledgment frame transmission unit 74 does not obtain the right to exclusively use the channel or if the acknowledgment frame is already transmitted, the inactive station conversion unit 66 converts the state from the awake window into an inactive state. In addition, if the data frame reception unit 73 does not finish receiving the second data frame immediately before the awake window counting unit 64 finishes the counting, the inactive state conversion unit 66 increases the awake window interval value by a predetermined value.

That is, if all data is received during an awake window interval, the state returns to an inactive state at a time when data reception is finished, that is, when an acknowledgment frame is transmitted. However, if there is remaining data to be received when the awake window closes, the station calculates the transmission time for data which the station is to receive and extends the awake window interval.

Figure 8:
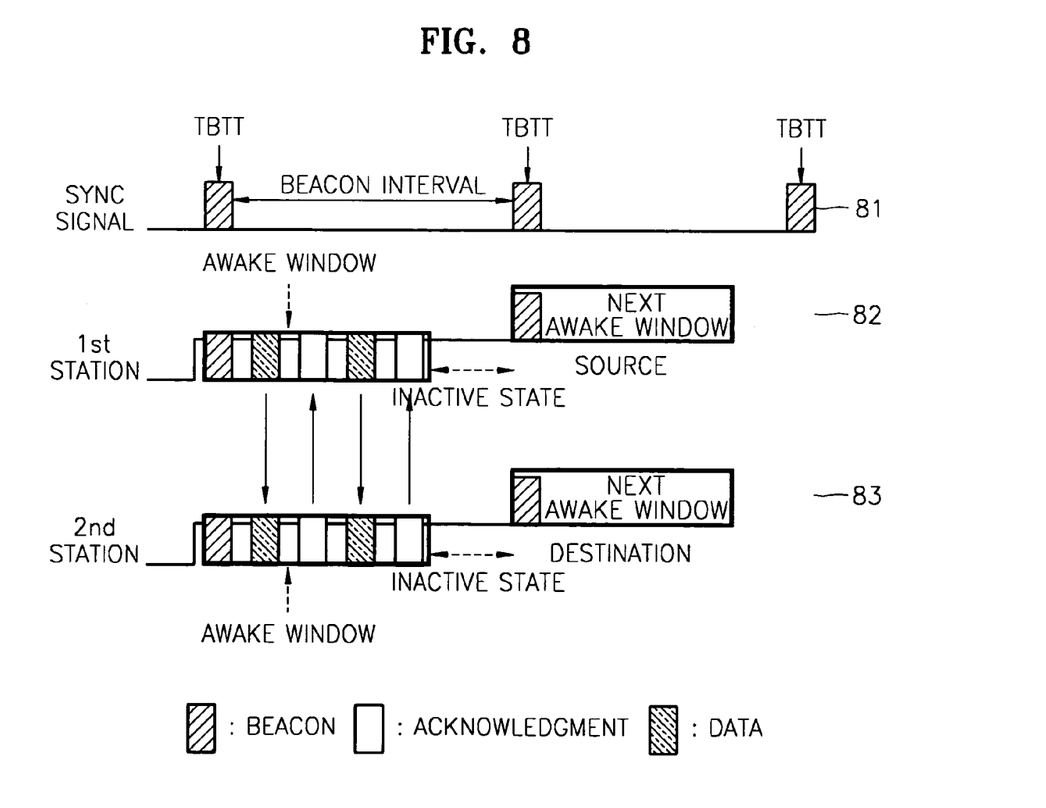
FIG. 8 is a waveform diagram of signals used in a power consumption reducing apparatus according to the present invention.

FIG. 8 is a waveform diagram of signals used in a power consumption reducing apparatus according to the present invention.

In each awake window, that is, at each TBIT time, a beacon frame containing synchronization information is transmitted to all the surrounding stations so that all stations on the wireless network are synchronized.

A first station and second station that receive the beacon frame set an awake window as the awake window interval value among the field values of the beacon frame in step 82 and 83. In the present invention, in order to reduce power consumption, the management frame such as the prior art ATIM message is not transmitted and during an awake window actual data is transmitted and received and if the awake window closes, the state is converted from an active state into an inactive state in step 82 and 83.

As shown in FIG. 8, in the present invention, the awake time of stations for exchanging actual data of the prior art is not actually used and in an inactive state. Accordingly, the back-off algorithm for this part is removed. That is, in the prior art, since channel contentions occur in two intervals including an interval for transmitting an ATIM message and an interval for actual data, the back-off timers used for the two intervals could greatly affect the throughput of the network. However, in the present invention, actual data is transmitted and received in the awake window, the number of actual contentions is reduced to only once and through this, the impact on the network throughput is minimized. Furthermore, by removing the network overhead like the ATIM message and its ACK message, improvement of the network performance can be expected. Just like all stations returning to an inactive state when an ATIM window closes, if an awake window closes, all stations except a station transmitting actual data return to an inactive state such that power consumption can be reduced. For example, in the prior art, when a very small amount of data is transmitted, a station should be in an active state even after it finishes transmission of the data, until the next ATIM window closes. Accordingly, power is unnecessarily consumed. However, in the present invention, if data is all transmitted and the awake window closes, the stations returns to an inactive state such that unnecessary power consumption can be minimized.

Figure 9:
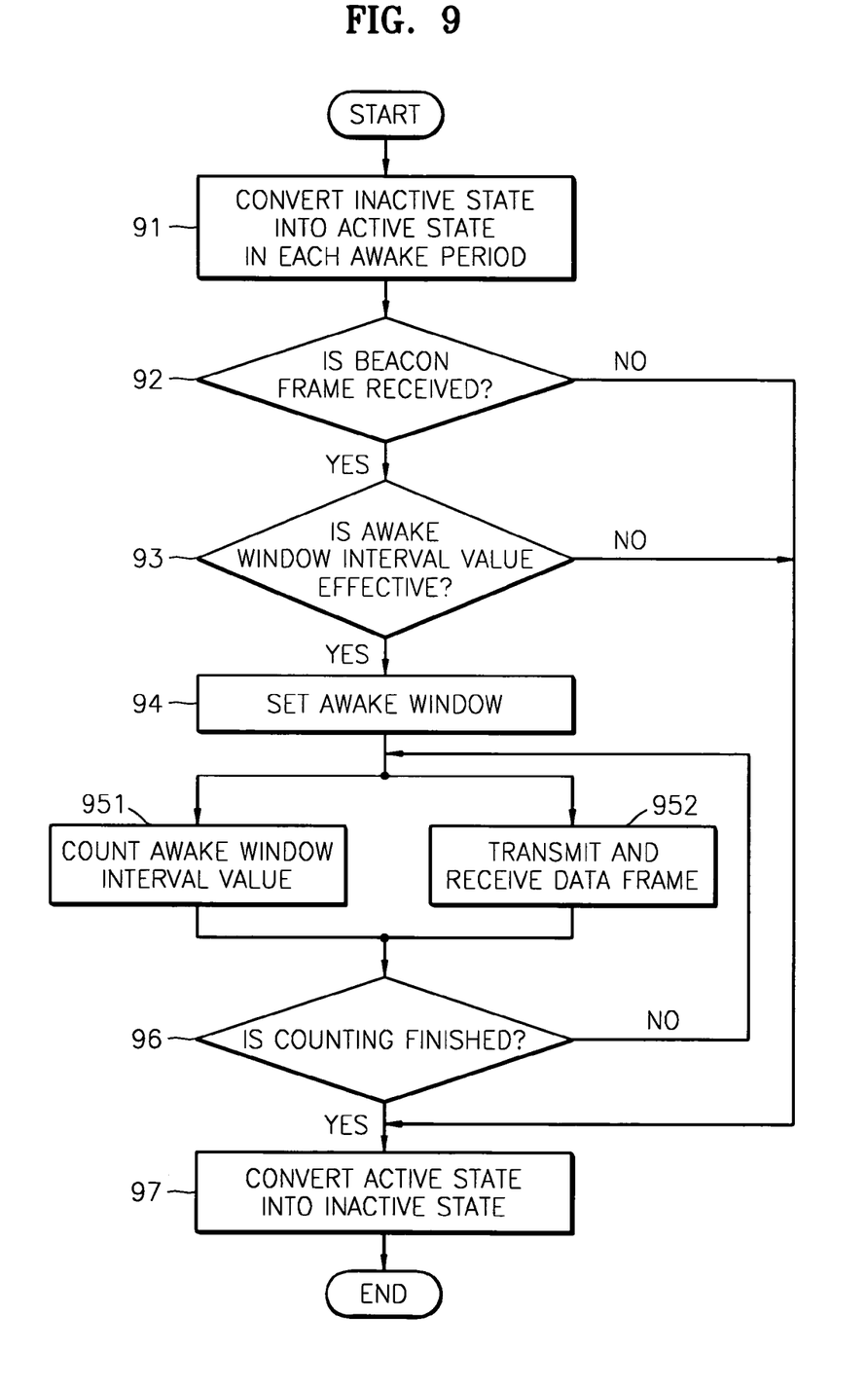
FIG. 9 is a flowchart of a process for reducing power consumption according to the present invention.

FIG. 9 is a flowchart of a process for reducing power consumption according to the present invention.

In each awake period, the state of a station is converted from an inactive state into an active state that has power consumption greater than that of the inactive state in step 91. Here, the active state is a state where full power is provided and the inactive state is a state where minimum power for conversion into an active state is provided.

Then, in the converted active sate, a beacon frame is received in step 92.

Then, when the beacon frame is received in the step 92 and the interval value of an awake window, in which an active state is maintained during a predetermined interval, is valid, an awake window is set in step 94. If the beacon frame is not received within a predetermined time, or if the beacon frame is received within a predetermined time and the length value of an awake window contained in the received beacon frame is not valid, the active state is converted into an inactive state.

Next, the interval value of the set awake window is counted in step 951. Generally, the counting is performed by repeatedly subtracting a predetermined unit value (usually 1 second) from the interval value of an awake window at each counting period. Then, in the set awake window, a predetermined data frame is received in step 952. Then, if the counting is finished in step 96, the state is converted by the awake window, into an inactive state in step 97.

If a power consumption reducing method is a method used in a first station on a wireless ad-hoc network, a beacon frame is a frame which is transmitted in each awake period through a predetermined channel to all stations on the wireless ad-hoc network except a station having transmitted the beacon frame.

Figure 10:
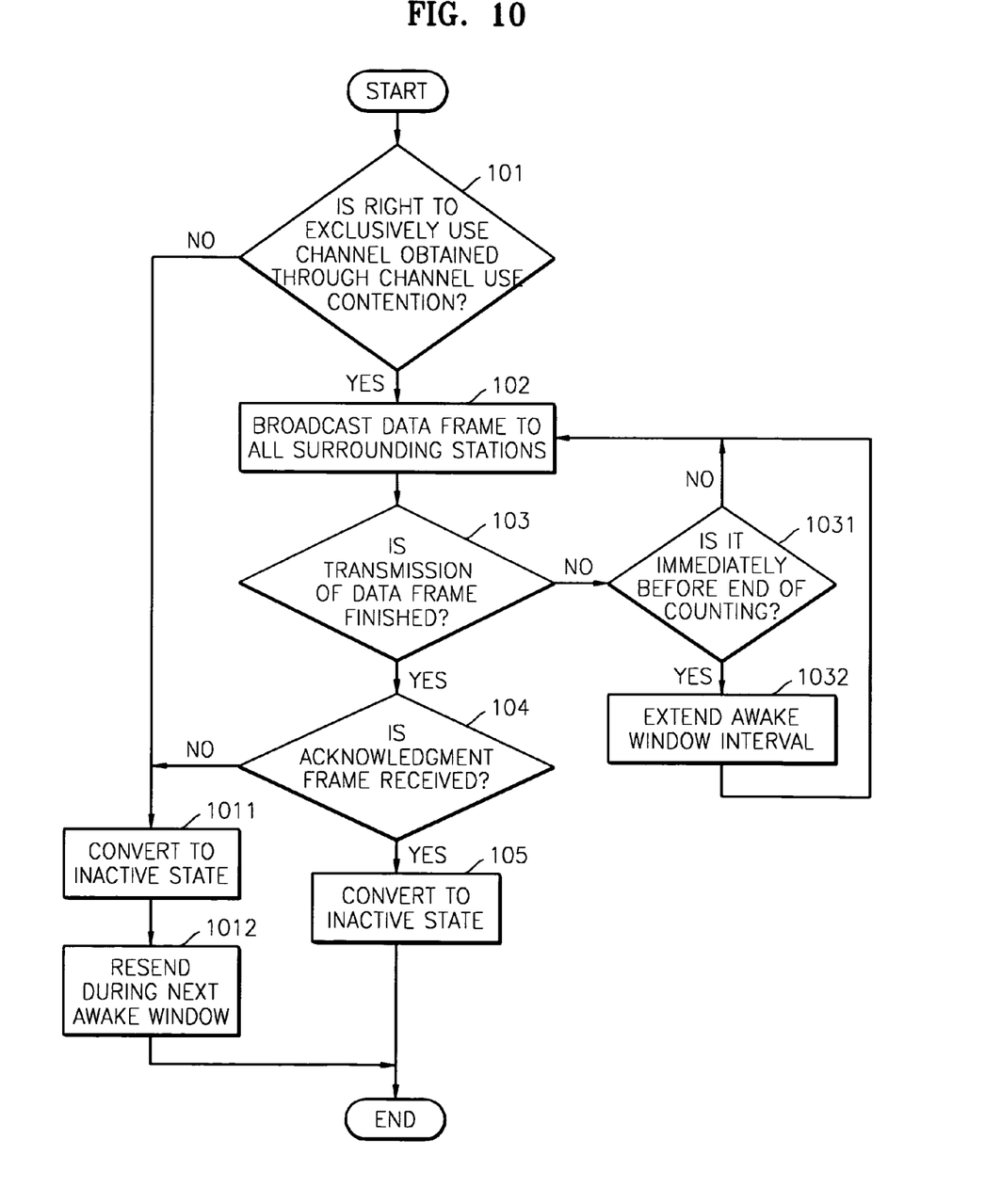
FIG. 10 is a flowchart of a process for transmitting a data frame in a source station.

FIG. 10 is a flowchart of a process for transmitting a data frame in a source station.

If the right to exclusively use a channel is obtained through a contention for channel use in step 101, a first data frame (a data frame which the first station desires to transmit to the second station) among data frames is transmitted through the channel to all the stations except the first station on the wireless ad-hoc network in step 102. Here, the first data frame is transmitted in a broadcasting method. Then, if the second station which receives the beacon frame and therefore is in an awake window receives the first data frame through the channel, an acknowledgment frame from the second station of the transmitted first data frame is received through the channel in step 104.

Here, when the right to exclusively use the channel is not obtained in the step 101, or when the acknowledgment frame is not received in the step 104, the right to exclusively use the channel is obtained in the next awake window set after the awake window and then, the first data frame among data frames is transmitted again through the channel to all the stations except the first station on the wireless ad-hoc network in step 1012.

Here, when the counting is not finished and if the right to exclusively use the channel is not obtained in the step 101, or if the acknowledgment frame is received in the step 104, the awake window is converted into an inactive state in steps 1011 and 105. Also, if the transmission of the first data frame is not finished immediately before the counting is finished in step 1031, the interval value is increased by a predetermined value in step 1032.

Figure 11:
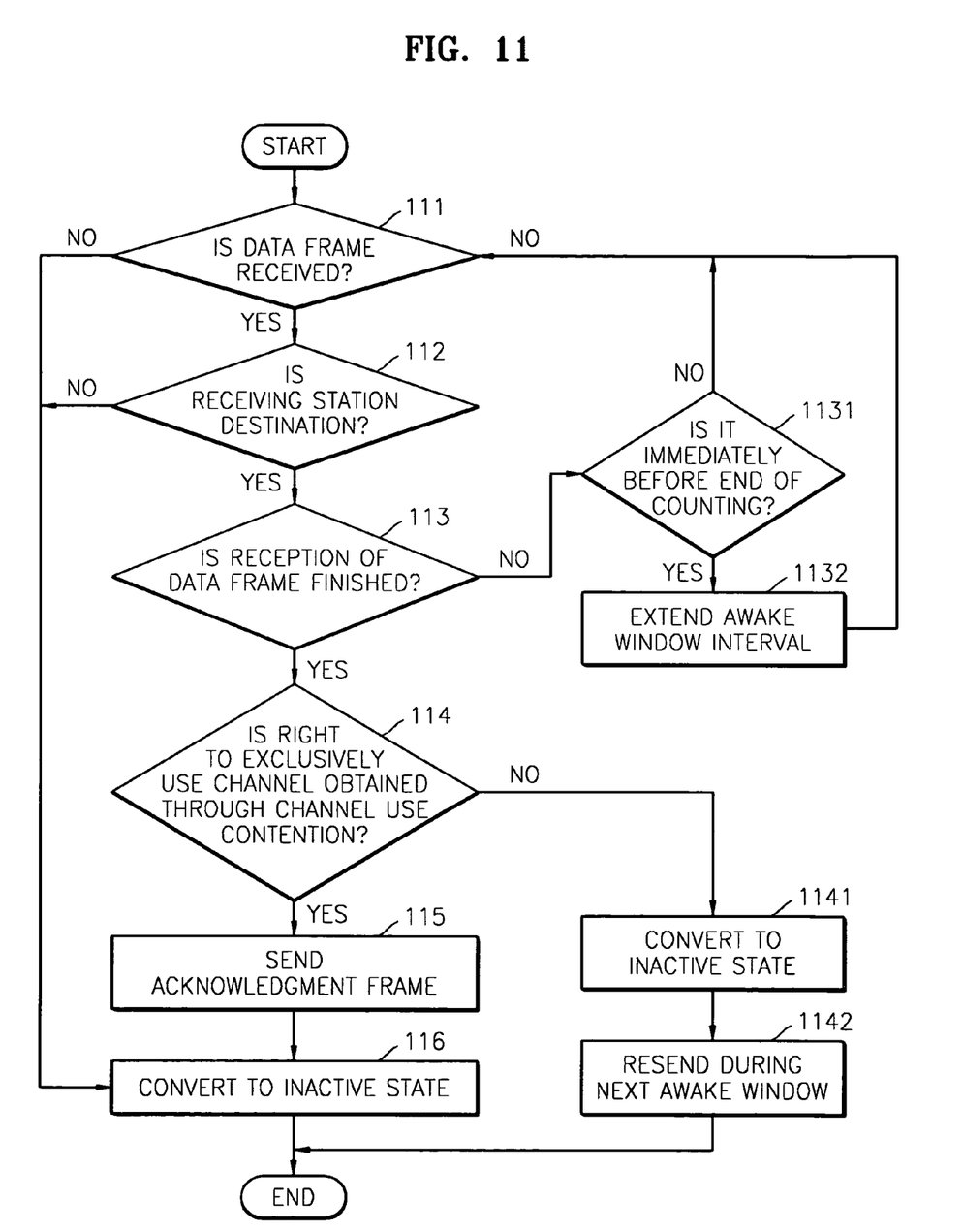
FIG. 11 is a flowchart of a process for receiving a data frame in a destination station.

FIG. 11 is a flowchart of a process for receiving a data frame in a destination station.

A second data frame among data frames from a third station, which has received the beacon frame and therefore is in an awake window and has obtained the right to use the channel, is received through the channel in step 111. Then, when the second frame is received and the destination field of the second data frame indicates the first station in step 112, and when the right to exclusively use the channel is obtained through a contention for the channel use in step 114, an acknowledgment frame of the second data frame from the third station is transmitted through the channel in step 115.

Here, when the right to exclusively use the channel is not obtained in the step 114 and in the next awake window set after the awake window, the right to exclusively use the channel is obtained through a contention for the channel, an acknowledgment frame to the first station is transmitted again through the channel.

Here, when the counting is not finished and if the second data frame is not received in the step 111, or if the second data frame is received and the destination field of the second data frame does not indicate the first station in the step 112, or if the right to exclusively use the channel is not obtained in the step 114, or if an acknowledgement frame is transmitted in the step 115, the awake window is converted into an inactive state in steps 116 and 1141.

Figure 12:
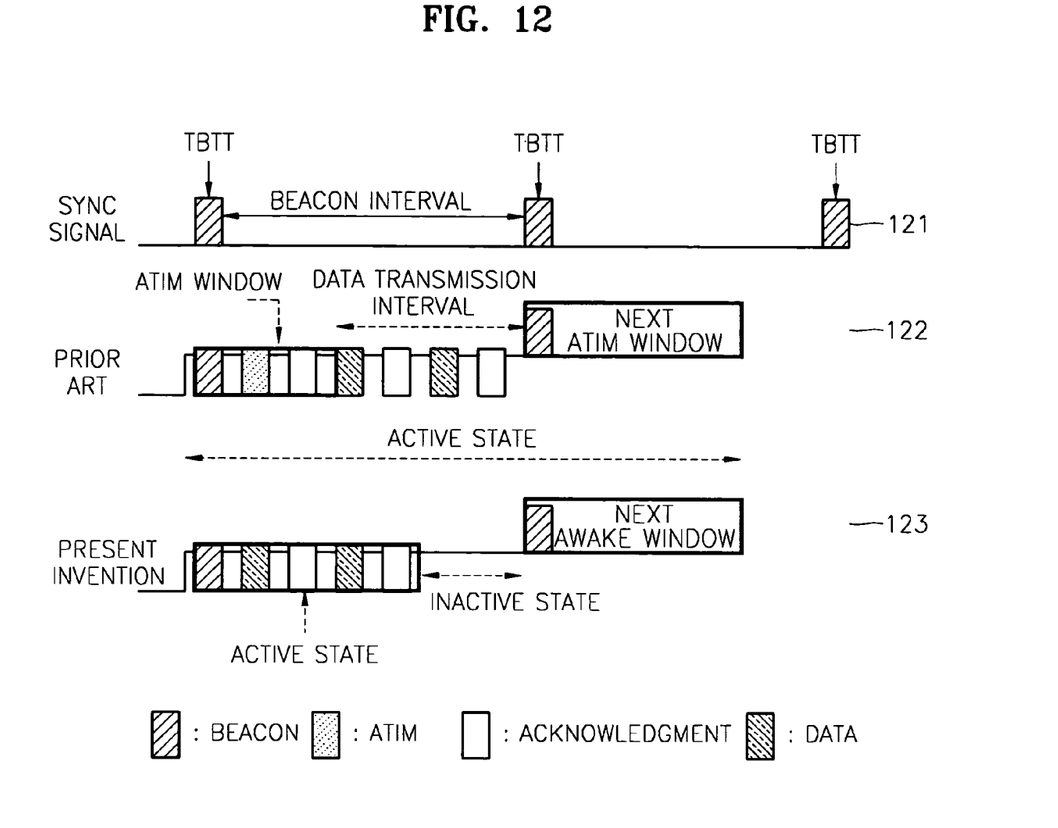
FIG. 12 is a schematic diagram comparing the waveform diagram of the prior art with that of the present invention.

FIG. 12 is a schematic diagram comparing the waveform diagram of the prior art with that of the present invention.

With a beacon frame transmitted in each target beacon transmission time (TBTT) that is a beacon frame transmission period, as a starting point, all stations receive network information and enter into an active state for new setting, and at the same time an ATIM window or an awake window begins in step 41.

In the prior art, an ATIM message simply makes a destination station remain in an awake state so as to receive data, and does not perform any other important roles in step 122. Accordingly, this ATIM message has been regarded as a network overhead. In the present invention, the ATIM message is replaced by an awake window such that an ATIM message and an acknowledgment frame for that are removed in step 123. That is, network overheads are removed.

In the prior art, during a data transmission duration when actual data is transmitted and received, an active state should be maintained. Accordingly, as shown in FIG. 12, a source station transmitting data and destination station receiving data should be always in an active state in step 122. Meanwhile, in the present invention, only during an awake window interval, an active state needs to be maintained such that as shown in FIG. 12 power consumption can be reduced during an inactive interval.

In the prior art, during an ATIM window interval and an interval when actual data is transmitted and received, two back-off algorithms are used respectively. However, in the present invention as described above, since a back-off algorithm is used only during an awake window interval, one back-off algorithm having the biggest influence on the throughput of a network is removed such that the throughput is raised in step 121.

Figure 13:
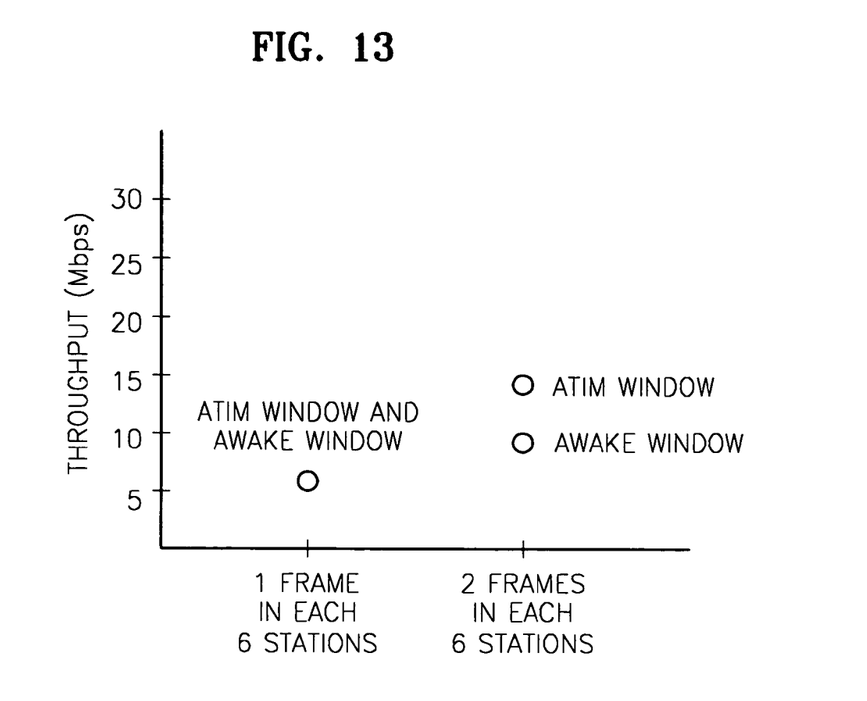
FIG. 13 is a diagram showing the results of simulations on the throughputs of the prior art and the present invention.

FIG. 13 is a diagram showing the results of simulations on the throughputs of the prior art and the present invention.

The method calculating a throughput by using the Equation 3 was employed and for simulation conditions in relation to energy, it was assumed that full power is used for a station transmitting data and a station in an inactive state does not use power. Also, a beacon frame interval is set to 10 ms and the size of an ATIM window and that of an awake window were set all to 2.5 ms. Accordingly, in the method using the ATIM window, an interval when actual data can be transmitted was 7.5 ms. The size of a frame was set to 1500 bytes that is an Ethernet standard. Since a time taken for transmitting a frame of a 1500-byte size including an average back-off interval is 389.5 s, if one station uses the conventional ATIM window, the station can transmit a maximum of 19 frames theoretically and in an awake window can transmit a maximum of 6 frames. However, since a variety window length concepts are actually included in an awake window, it can transmit more frames than the theoretical number. Accordingly, if it is assumed that only one station transmits data, during an awake window the same amount as in the ATIM window can be transmitted.

The simulations were performed on two simulation groups in order to obtain the results. By assuming for both simulation groups an idealistic case without a collision between stations, the simulations were carried out. That is, it was assumed that each station can transmit all desired data continuously through channel contentions. In the first simulation, it was assumed that 6 stations desire to transmit data and each station wants to transmit two frames, each 1500-byte size. In the second simulation, it was assumed that 6 stations desire to transmit a frame of a 1500-byte size.

The simulation result for the case when two frames were to be transmitted indicates as shown that when the ATIM window was used a better throughput was obtained than when the awake window was used. However, for the case when one frame was to be transmitted, the simulation result showed no difference between the two methods. However, since the simulation assumed the conditions as idealistic ones, it seems that the throughput of the ATIM window having more channel contentions and network overheads will be affected more greatly in the actual situation.

Figure 14:
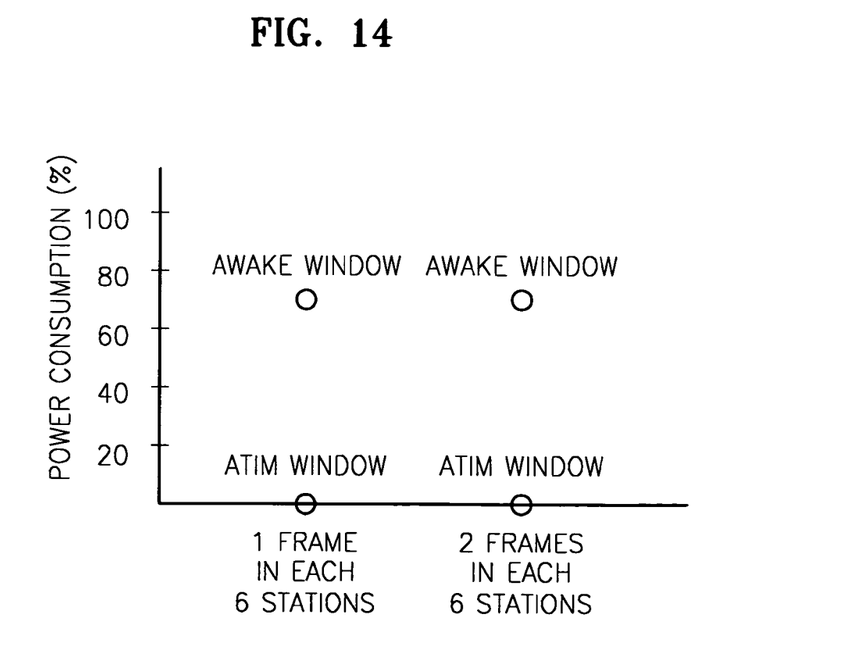
FIG. 14 is a diagram showing the results of simulations on the power consumptions of the prior art and present inventions.

FIG. 14 is a diagram showing the results of simulations on the power consumptions of the prior art and present inventions.

As for power consumption, when an ATIM window is used, an interval for transmitting actual data takes 75% of the entire beacon interval. Accordingly, it can be said that compared to a case where an awake window having the same length closes and all stations enter into a doze state, 75% more power is used. As shown in FIG. 14, the results show the power consumption of the two methods. In conclusion, it is shown that an awake window can reduce 75% of power which is consumed when an ATIM window is used between two stations for data transmission.

The present invention may be embodied in a code, which can be read by a computer, on a computer readable recording medium. The computer readable recording medium includes all kinds of recording apparatuses on which computer readable data are stored.

Also, the data structure used in the embodiments of the present invention can be recorded on a recording medium through a variety of means.

The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet).

Optimum embodiments have been explained above and are shown. However, the present invention is not limited to the exemplary embodiment described above, and it is apparent that variations and modifications by those skilled in the art can be effected within the spirit and scope of the present invention defined in the appended claims. Therefore, the scope of the present invention is not determined by the above description but by the accompanying claims.

According to the present invention, an active state needs to be maintained only during a window interval such that power consumption can be reduced during an inactive interval. Also, in the present invention, by using a back-off algorithm only during an awake interval, one back-off algorithm that is a factor having the greatest influence on the network throughput is removed such that the network throughput can be raised. In addition, according to the present invention, an ATIM window is replaced by an awake window such that an ATIM message that has been regarded as a network overhead, and an acknowledge response frame to the message are removed, that is, the network overheads are removed.

What is claimed is:

1. A power consumption reducing apparatus comprising:
   a periodic active state conversion unit which, in each awake period, converts an inactive state into an active state, wherein power consumption is greater in the active state than in the inactive state;
   a beacon frame reception unit which, in an active state converted by the period active state conversion unit, receives a beacon frame;
   an awake window setting unit which, when the beacon frame reception unit receives the beacon frame, and if an interval value of an awake window, in which the active state is maintained for a predetermined time, among field values of the received beacon frame is valid, sets the awake window;

an awake window interval counting unit which counts, in a counting, the interval value in the awake window set by the awake window setting unit; and an inactive state conversion unit which, if the awake window counting unit finishes the counting, converts the awake window into an inactive state, wherein if the beacon frame reception unit does not receive the beacon frame within a predetermined time, or if the beacon frame is received within the predetermined time and a length value of the awake window contained in the received beacon frame is not valid, the awake window setting unit converts the active state into the inactive state.

2. The apparatus of claim 1, wherein the awake window counting unit counts by repeatedly subtracting a predetermined unit value from the interval value of the awake window in each counting period.

3. The apparatus of claim 1, wherein the active state is a state where a full power is provided and the inactive state is a state where a minimum power needed for conversion into the active state is provided.

4. The apparatus of claim 1, further comprising:
a data frame transmission and reception unit which transmits and receives a predetermined data frame in the awake window set by the awake window setting unit.

5. The apparatus of claim 4, wherein the power consumption reducing apparatus is an apparatus of a first station on a predetermined wireless ad-hoc network.

6. The apparatus of claim 5, wherein in each awake period, the beacon frame is transmitted through a predetermined channel to all stations, except a station having transmitted the beacon frame, on the wireless ad-hoc network.

7. The apparatus of claim 6, wherein the data frame transmission and reception unit comprises:
a data frame transmission unit which, when a right to exclusively use a channel is obtained through a contention for a channel use, transmits a first data frame among data frames to all stations except the first station on the wireless ad-hoc network through the channel; and
an acknowledgment frame reception unit which, when a second station, which has received the beacon frame and is in the awake window, receives the first data frame through the channel, receives an acknowledgment frame through the channel from the second station of the first data frame transmitted by the data frame transmission unit.

8. The apparatus of claim 7, wherein the data frame transmission unit transmits the first data frame in a broadcast method.

9. The apparatus of claim 7, wherein when the data frame transmission unit does not obtain the right to exclusively use the channel, or if the acknowledgment frame reception unit does not receive the acknowledgment frame, the data frame transmission unit tries to obtain the right to exclusively use the channel through another contention for the channel use in another awake window set after the awake window, and if the right is obtained, transmits again the first data frame among the data frames to all the stations except the first station on the wireless ad-hoc network through the channel.

10. The apparatus of claim 7, wherein when the awake window counting unit does not finish the counting, and if the data frame transmission unit does not obtain the right to exclusively use the channel, or if the acknowledgment frame reception unit receives the acknowledgment frame, the inactive state conversion unit converts the awake window into the inactive state.

11. The apparatus of claim 7, wherein if the data frame transmission unit does not finish transmission of the first data immediately before the awake window counting unit finishes the counting, the inactive state conversion unit increases the interval value by a predetermined value.

12. The apparatus of claim 6, wherein the data frame transmission and reception unit comprises:
a data frame reception unit which receives a second data frame among the data frames through the channel from a third station, which receives a beacon frame, is in the awake window, and has obtained the right to use the channel; and
an acknowledgment frame transmission unit which, when the data frame reception unit receives the second data frame and a destination field of the second data indicates the first station, and if the right to exclusively use the channel is obtained through a contention for the channel use, transmits an acknowledgment frame of the second data frame from the third station through the channel.

13. The apparatus of claim 12, wherein if the acknowledgment frame transmission unit does not obtain the right to exclusively use the channel, the acknowledgment frame transmission unit tries to obtain the right to use the channel through another contention for the channel use in another awake window set after the awake window, and if the right is obtained, transmits again the acknowledgment frame to the third station through the channel.

14. The apparatus of claim 12, wherein when the awake window counting unit does not finish the counting, and if the data frame reception unit does not receive the second data frame or if the second data frame is received and the destination field of the second data frame does not indicate the first station, or if the acknowledgment frame transmission unit does not obtain the right to exclusively use the channel, or if the acknowledgment frame is transmitted, the inactive state conversion unit converts the awake window into the inactive state.

15. The apparatus of claim 12, wherein if the data frame reception unit does not finish reception of the second data immediately before the awake window counting unit finishes the counting, the inactive state conversion unit increases the interval value by a predetermined value.

16. The apparatus of claim 1, further comprising a data frame transmission and reception unit which transmits and receives a predetermined data frame in the awake window set by the awake window setting unit, the data frame transmission and reception unit comprising:
a data frame transmission unit which, if a right to exclusively use a channel is obtained through a contention for a channel use, transmits a first data frame among data frames to all stations except the first station on the wireless ad-hoc network through the channel; and
an acknowledgment frame reception unit which, if a second station, which has received the beacon frame and is in the awake window, receives the first data frame through the channel, receives an acknowledgment frame through the channel from the second station of the first data frame transmitted by the data frame transmission unit.

17. The apparatus of claim 1 further comprising a data frame transmission and reception unit which transmits and receives a predetermined data frame in the awake window set by the awake window setting unit, the data frame transmission and reception unit comprising:
- a data frame reception unit which receives a second data frame among the data frames through the channel from a third station, which receives a beacon frame, is in the awake window, and has obtained the right to use the channel; and
- an acknowledgment frame transmission unit which, if the data frame reception unit receives the second data frame and a destination field of the second data indicates the first station, and if the right to exclusively use the channel is obtained through a contention for the channel use, transmits an acknowledgment frame of the second data frame from the third station through the channel.

18. A power consumption reducing method comprising:
(a) converting in each awake period, an inactive state into an active state as a converted active state, wherein power consumption is greater in the active state than in the inactive state;
(b) receiving, in the converted active state, a beacon frame as a received beacon frame;
(c) when the beacon frame is received in the step (b), and if an interval value of an awake window, in which the active state is maintained for a predetermined time, among field values of the received beacon frame is valid, setting the awake window as a set awake window;
(d1) counting the interval value in the set awake window; and
(e) if the counting is finished in the step (dl), converting the awake window into the inactive state, wherein in the step
(c) if the beacon frame is not received in the step (a) within a predetermined time, or if the beacon frame is received within the predetermined time and a length value of the awake window contained in the received beacon frame is not valid, the active state is converted into the inactive state.

19. The method of claim 18, wherein in the step (d1) counting is performed by repeatedly subtracting a predetermined unit value from the interval value of the awake window in each counting period.

20. The method of claim 18, wherein the active state is a state where a full power is provided and the inactive state is a state where a minimum power needed for conversion into the active state is provided.

21. The method of claim 18, further comprising:
(d2) transmitting and receiving a predetermined data frame in the awake window set in the step (c).

22. The method of claim 21, wherein the power consumption reducing method is a method used in a first station on a predetermined wireless ad-hoc network.

23. The method of claim 22, wherein in each awake period, the beacon frame is transmitted through a predetermined channel to all stations, except a station having transmitted the beacon frame, on the wireless ad-hoc network.

24. The method of claim 23, wherein the step (d2) comprises:
(d21) transmitting when a right to exclusively use the channel is obtained through a contention for the channel use, a first data frame among data frames to all stations except the first station on the wireless ad-hoc network through the channel; and
(d22) receiving when a second station, which has received the beacon frame and is in the awake window, receives the first data frame through the channel, an acknowledgment frame through the channel from the second station of the first data frame transmitted by the data frame transmission unit.

25. The method of claim 24, wherein in the step (d21) the first data frame is transmitted in a broadcast method.

26. The method of claim 24, wherein when the right to exclusively use the channel is not obtained in the step (d21), or if the acknowledgment frame is not received in the step (d22), in the step (d21) if the right to exclusively use the channel is obtained through another contention for the channel use in another awake window set after the awake window, the first data frame among the data frames is transmitted again to all the stations except the first station on the wireless ad-hoc network through the channel.

27. The method of claim 24, wherein in the step (e), when the counting is not finished in the step (d1) and if the right to exclusively use the channel is not obtained in the step (d21), or if the acknowledgment frame is received in the step (d22), the awake window is converted into the inactive state.

28. The method of claim 24, wherein in the step (e), if transmission of the first data is not finished in the step (d21) immediately before the counting is finished, the interval value is increased by a predetermined value.

29. The method of claim 23, wherein the step (d2) comprises:
(d21) receiving a second data frame among the data frames through the channel from a third station, which receives a beacon frame, is in the awake window, and has obtained the right to use the channel; and
(d22) transmitting when the second data frame is received in the step (d21) and a destination field of the second data indicates the first station, and if the right to exclusively use the channel is obtained through a contention for the channel use, an acknowledgment frame of the second data frame from the third station through the channel.

30. The method of claim 29, wherein if the right to exclusively use the channel is not obtained, in the step (d22), and if the right to use the channel is obtained through another contention for the channel use in another awake window set after the awake window, the acknowledgment frame is transmitted again to the third station through the channel.

31. The method of claim 29, wherein in the step (e), when the counting is not finished in the step (d1), and if the second data frame is not received in the step (d21) or if the second data frame is received and the destination field of the second data frame does not indicate the first station, or if the right to exclusively use the channel is not obtained in the step (d22), or if the acknowledgment frame is transmitted, the awake window is converted into the inactive state.

32. The method of claim 29, wherein in the step (e), if reception of the second data is not finished immediately before the counting is finished, the interval value is increased by a predetermined value.

33. The method of claim 18 further comprising (d2) transmitting and receiving a predetermined data frame in the awake window set in the step (c), (d2) comprising:
(d21) transmitting when a right to exclusively use the channel is obtained through a contention for the channel use, a first data frame among data frames to all stations except the first station on the wireless ad-hoc network through the channel; and
(d22) receiving when a second station, which has received the beacon frame and is in the awake window, receives the first data frame through the channel, an acknowledgment frame through the channel from the second station of the first data frame transmitted by the data frame transmission unit.

34. The method of claim 18 further comprising (d2) transmitting and receiving a predetermined data frame in the awake window set in the step (c), (d2) comprising:
(d21) receiving a second data frame among the data frames through the channel from a third station, which receives a beacon frame, is in the awake window, and has obtained the right to use the channel; and
(d22) transmitting when the second data frame is received in the step (d21) and a destination field of the second data indicates the first station, and if the right to exclusively use the channel is obtained through a contention for the channel use, an acknowledgment frame of the second data frame from the third station through the channel.

35. A computer readable medium having embodied thereon a computer program for enabling a computer to provide a service of reducing power consumption, the service comprising:
(a) converting in each awake period, an inactive state into an active state as a converted active state, wherein power consumption is greater in the active state than in the inactive state;
(b) receiving, in the converted active state, a beacon frame as a received beacon frame;
(c) when the beacon flame is received in the step (b), and if an interval value of an awake window, in which the active state is maintained for a predetermined time, among field values of the received beacon flame is valid, setting the awake window as a set awake window;
(d1) counting the interval value in the set awake window; and
(e) if the counting is finished in the step (d1), converting the awake window into the inactive state, wherein in the step
(c) if the beacon frame is not received in the step (a) within a predetermined time, or if the beacon frame is received within the predetermined time and a length value of the awake window contained in the received beacon frame is not valid, the active state is converted into the inactive state.

36. The computer readable medium of claim 35, wherein in the step (d1) counting is performed by repeatedly subtracting a predetermined unit value from the interval value of the awake window in each counting period.

37. The computer readable medium of claim 35, wherein the active state is a state where a full power is provided and the inactive state is a state where a minimum power needed for conversion into the active state is provided.

38. The computer readable medium of claim 35, further comprising:
(d2) transmitting and receiving a predetermined data frame in the awake window set in the step (c).

39. The computer readable medium of claim 38, wherein the power consumption reducing method is a method used in a first station on a predetermined wireless ad-hoc network.

40. The computer readable medium of claim 39, wherein in each awake period, the beacon frame is transmitted through a predetermined channel to all stations, except a station having transmitted the beacon frame, on the wireless ad-hoc network.

41. The computer readable medium of claim 40, wherein the step (d2) comprises:
(d21) transmitting when a right to exclusively use the channel is obtained through a contention for the channel use, a first data frame among data frames to all stations except the first station on the wireless ad-hoc network through the channel; and
(d22) receiving when a second station, which has received the beacon frame and is in the awake window, receives the first data frame through the channel, an acknowledgment frame through the channel from the second station of the first data frame transmitted by the data frame transmission unit.

42. The computer readable medium of claim 41, wherein in the step (d21) the first data frame is transmitted in a broadcast method.

43. The computer readable medium of claim 41, wherein when the right to exclusively use the channel is not obtained in the step (d21), or if the acknowledgment frame is not received in the step (d22), in the step (d21) if the right to exclusively use the channel is obtained through another contention for the channel use in another awake window set after the awake window, the first data frame among the data frames is transmitted again to all the stations except the first station on the wireless ad-hoc network through the channel.

44. The computer readable medium of claim 41, wherein in the step (e), when the counting is not finished in the step (d1) and if the right to exclusively use the channel is not obtained in the step (d21), or if the acknowledgment frame is received in the step (d22), the awake window is converted into the inactive state.

45. The computer readable medium of claim 41, wherein in the step (e), if transmission of the first data is not finished in the step (d21) immediately before the counting is finished, the interval value is increased by a predetermined value.

46. The computer readable medium of claim 40, wherein the step (d2) comprises:
(d21) receiving a second data frame among the data frames through the channel from a third station, which receives a beacon frame, is in the awake window, and has obtained the right to use the channel; and
(d22) transmitting when the second data frame is received in the step (d21) and a destination field of the second data indicates the first station, and if the right to exclusively use the channel is obtained through a contention for the channel use, an acknowledgment frame of the second data frame from the third station through the channel.

47. The computer readable medium of claim 46, wherein if the right to exclusively use the channel is not obtained, in the step (d22), and if the right to use the channel is obtained through another contention for the channel use in another awake window set after the awake window, the acknowledgment frame is transmitted again to the third station through the channel.

48. The computer readable medium of claim 46, wherein in the step (e), when the counting is not finished in the step (d1), and if the second data frame is not received in the step (d21) or if the second data frame is received and the destination field of the second data frame does not indicate the first station, or if the right to exclusively use the channel is not obtained in the step (d22), or if the acknowledgment frame is transmitted, the awake window is converted into the inactive state.

49. The computer readable medium of claim 46, wherein in the step (e), if reception of the second data is not finished immediately before the counting is finished, the interval value is increased by a predetermined value.

* * * * *